US008652377B2

(12) United States Patent
Van Meerbeek et al.

(10) Patent No.: US 8,652,377 B2
(45) Date of Patent: Feb. 18, 2014

(54) TUBULAR FREE-SHAPED ARTICLE

(75) Inventors: Andre Van Meerbeek, Saint-Symphorien (BE); Antonius van Meesche, Boucoiran et Nozières (FR); Andre Goossens, Lasne (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 854 days.

(21) Appl. No.: 11/354,637

(22) Filed: Feb. 15, 2006

(65) Prior Publication Data

US 2006/0186583 A1    Aug. 24, 2006

(51) Int. Cl.
*D01D 5/24*    (2006.01)

(52) U.S. Cl.
USPC ................................... 264/171.26

(58) Field of Classification Search
USPC .......... 264/552, 511, 171.26; 428/34.2, 36.91
See application file for complete search history.

(56) References Cited

U.S. PATENT DOCUMENTS

| | | | |
|---|---|---|---|
| 5,298,206 A | | 3/1994 | Milliken et al. |
| 5,336,349 A | * | 8/1994 | Cornils et al. ................ 156/107 |
| 5,520,870 A | | 5/1996 | Allan et al. ................ 264/210.2 |
| 6,007,319 A | | 12/1999 | Jacobson .................... 425/140 |
| 2005/0170118 A1 | * | 8/2005 | Cleveland et al. ......... 428/36.91 |

FOREIGN PATENT DOCUMENTS

| | | | |
|---|---|---|---|
| EP | 1 331 080 | 7/2003 | ............ B29C 47/02 |
| JP | 05-192980 | 8/1993 | |
| WO | 93/06985 | 4/1993 | |
| WO | WO 93/21466 | * 10/1993 | |
| WO | 97/11831 | 4/1997 | |
| WO | 00/15994 | 3/2000 | |
| WO | WO 01/64436 | * 9/2001 | |
| WO | 03/095538 | 11/2003 | |
| WO | WO 2005/021643 | 3/2005 | |

OTHER PUBLICATIONS

Japanese Abstract, Publication No. JP 59188423, published Oct. 25, 1984, Inventor: Takano Tetsuzo, entitled "Method for Molding Automatically Bent Tube".
Goettler et al., entitled "Extrusion-Shaping of Curved Hose Reinforced with Short Cellulose Fibers", pp. 277-301, Rubber Chemistry and Technology, Rubber Chemicals Division, Akron, OH, vol. 54, No. 2, 1981.

* cited by examiner

*Primary Examiner* — Larry Thrower

(57) ABSTRACT

The invention relates to a process for manufacturing of tubular free-shaped articles having an inner polymer layer and an outer polymer layer by co-extruding at least two different polymers in an extruder apparatus comprising an extrusion die and at least two extruder barrels/heads. The invention furthermore relates to a tubular free-shaped article comprising at least two layers of different polymers and which article is obtained by the process according to the invention.

17 Claims, No Drawings

TUBULAR FREE-SHAPED ARTICLE

CROSS-REFERENCE TO RELATED APPLICATION

The present Application claims priority to European Patent Application No. 05101346.4, filed on Feb. 22, 2005.

FIELD OF THE INVENTION

The present invention relates to a process for manufacturing tubular free-shaped articles having an inner polymer layer and an outer polymer layer by co-extruding at least two different polymers in an extruder apparatus comprising an extrusion die and at least two extruder barrels/heads. The invention furthermore relates to a tubular free-shaped article comprising at least two layers of different polymers and which article is obtained by the process according to the invention.

BACKGROUND OF THE INVENTION

After assembling engines and car bodies a conducting connection between the different aggregates by water-, fuel-, air- and pressure lines has to be accomplished. Due to the minor amount of space under the hood of an automobile, hoses used for the connection of engine, cooler, radiator and fuel tank, etc. have to be individually adapted to the various types of engine and car body. Depending on the space available under the vehicle hood the shape of the hoses may be very complex.

Consequently, there is a strong need for hoses, in particular, coolant hoses and/or fuel lines, having a complex shape and a good resistance to the rough environmental conditions in applications under the hood.

Automotive hoses are exposed to exceedingly harsh environments. Factors including varying pressures and temperatures at different points of the hose, varying diameters of different hoses in a particular circuit, as well as chemical exposure result in the need for highly rigorous hoses.

Currently some fuel lines and coolant hoses are made by classical straight extrusion or co-extrusion in nylon/TPV configuration; the shaping of the tubes occurs off-line using various thermo-forming or thermo-fixation techniques. Off-line shaping is a cost and labor intensive process since the green tubes to be shaped are manually fitted into the shaping equipment and afterwards the shaped tubes have to be removed by hand. Due to the thermal treatment in open air some degradation at the surface of the articles may occur.

Some of the commercially available fuel lines and coolant hoses are partially corrugated. However, these corrugated sections may offer more resistance to flow than tubes that are smooth on the inside surface. In addition such sections may cause the formation of deposits.

U.S. Pat. No. 5,336,349 relates to an apparatus for providing the surface of an article, for instance a car wind screen, with a profiled gasket by supplying a thermoplastic elastomer via an extruder and a heated pressure hose to a heated extrusion die. The extrusion die is guided by a robot, and the elastomer is extruded and laid by means of the extrusion die onto the surface. Therefore, the shape of the obtained profile is mainly dependent on the topography of the supporting surface.

Due to the low green-strength of several important polymers, for instance of polyamides used for the manufacturing of automotive fuel lines, the process disclosed by U.S. Pat. No. 5,336,349 can not be applied when three dimensional shaped free-standing articles are desired since a free-shaping of the extrudate independent from the underlying surface can not be accomplished by the disclosed method. In case of such polymers having insufficient green strength the tubular extrudate would immediately collapse after leaving the die orifice.

Therefore, it has been an object underlying the present invention to provide a method for the free shaping of hoses made from materials having low green-strength.

It has surprisingly been found that this object can be accomplished by supporting a polymeric layer obtained from a polymer having insufficient green-strength by a second adjacent support layer of adequate green-strength. For instance, a layer of a polymer having adequate green-strength on the inside and/or the outside of an extruded tubular article of a polymer having insufficient green-strength avoids collapsing of the supported layer after leaving the die orifice. Both layers (the supporting layer and the supported layer) may be formed in one shot by co-extruding the polymers and by a simultaneous shaping operation in order to obtain the desired tubular articles of complex shape.

SUMMARY OF THE INVENTION

In a first embodiment the present invention relates to a process for manufacturing a tubular shaped co-extruded article comprising processing at least two different polymers (A) and (B) in an extruder apparatus that comprises
 an extrusion die adapted to form a tubular extrudate;
 at least two extruder barrels/heads adapted to extrude said polymers through said extrusion die in order to form a tubular polymeric extrudate comprising an inner polymer layer (A) and an outer polymer layer (B);
wherein said extruder barrels discharge through said extrusion die that is controllably connected to a robotic handling unit.

In a preferred embodiment of the invention the extrusion die is connected to the extruder barrels by way of pressure hoses, preferably heated pressure hoses.

In a further embodiment the present invention relates to a tubular shaped article obtainable by the process described above.

DESCRIPTION OF THE INVENTION

In conjunction with the present invention the term "green strength" describes the structural integrity necessary to minimize the shape distortion prior to the solidification of the extrudate after leaving the extrusion die orifice. Polymers having insufficient green strength suffer from an immediate loss of structural integrity after leaving the die orifice of the extrusion die. In contrast, polymers with adequate green strength maintain their shape after exiting the die.

The terms "adequate" and "insufficient" green strength that are used in order to evaluate the structural integrity of the co-extruded polymers describe the structural integrity of the extruded layers relative to each other.

The term "tubular" in conjunction with the present invention denotes a generally tube-like shape of the extrudate/parison which includes profiles, tubes, pipes or hoses and complex shaped articles such as hoses or profiles provided with external or internal lips or noses.

The co-extrusion apparatus used according to the present invention is similar to the robotic extrusion assembly as described in U.S. Pat. No. 5,336,349 to Comils et al., the disclosure of which is fully incorporated herein by reference. Co-extrusion technology and co-extrusion dies are conventional in the art and known to the skilled person.

According to the present invention the at least two different polymers are fed through separate extruders.

In a preferred embodiment of the invention the extruder barrels are connected to the heated extrusion die by means of flexible pressure hoses. In an alternative embodiment at least one of the extruders is attached straight to the die and moved together with it.

The extrusion die is controllably connected to a robotic handling (operating) unit. Guided by the robotic handling unit the at least two polymers are co-extruded and simultaneously shaped in a three-dimensional manner by the movements of the handling unit. In this conjunction the phrase "controllably connected" means that the die may be moved at least two-dimensionally, preferably three-dimensionally.

In a further embodiment of the invention the shaped article obtained by the method of the invention can be laid onto a preferably pre-shaped supplementary surface in order to allow the article to cool down to room temperature from which it is subsequently removed.

In the method according to this invention common screw-extruders comprising external cylinder heaters that plasticize the polymeric material to the necessary processing temperature and viscosity may be used. The molten polymers are supplied from the discharging zones of each of the extruders to the extrusion die via separate flexible high pressure hoses. Each of these pressure hoses is provided with a suitable heating device. The hoses must be capable of resisting the high pressures necessary to process the molten viscous polymers.

The extrusion die is heated by means of a suitable heating device to a temperature that is sufficiently elevated to allow the polymers to be processed. The die is guided by means of a robot. Depending on the needs the pressure hoses may have a length of from about 20 cm to about 6.0 m, and a diameter of from about 5 mm to 50 mm.

For further particulars about robotic extrusion reference is made to U.S. Pat. No. 5,336,349 to Cornils et al., the disclosure of which is incorporated herein by reference in its entirety.

In order to produce a shaped extrudate the dry polymers/polymer blends are typically processed in long-barrel extruders having a barrel length/diameter (L/D) ratio in the range from about 24:1 to about 60:1. The extruders are equipped with a screw that provides for a compression ratio greater than about 2.5:1, and a substantially constant pressure on the melt within the barrel and, preferably, in the entry zone of a grooved barrel section. In one embodiment the diameter of said barrel is in the range of from about 2.54 cm to about 15.24 cm. The extrudates may also be produced in a tandem or twin-screw extruder. In the case of processing rubbers conventionally known in the art rubber extruders can be used.

Typical extrusion temperatures generally range from about 80° C. to about 300° C., preferably from about 100° C. to about 250° C. Extrusion of rubbers is accomplished at a temperature of from about 80° C. to about 100° C., preferably of from about 80° C. to about 100° C.

The co-extrusion die to be used for the process according to the present invention is not limited to any specific kind of extrusion die.

If fiber-reinforced polymers are used in accordance with one embodiment of the present invention an extrusion die that facilitates the control of the fiber orientation within the extrudate is preferably used. In a preferred embodiment mandrel expansion dies or dam dies can be used. Such dies are disclosed in U.S. Pat. No. 4,057,610 and U.S. Pat. No. 4,057,617, the disclosure of which is fully incorporated herein by reference. The orientation of the fibers can be determined by the type of die.

In a further preferred embodiment the extrusion die is a moving mandrel expanding die comprising an inner die member (mandrel) and an outer die member which can be moved/offset relative to each other to result in eccentricity in the annular die passage as disclosed in L. A. Goettler, A. J. Lambright, R. I. Leib and P. J. DiMauro at the meeting of the Rubber Division of the American Chemical Society on 7 to 10 Oct. 1980 in Detroit, Mich. With this assembly acute bends are formed by off-setting the inner and outer part of the mandrel expansion extrusion die and wider bends may be formed by the movement of the robotic handling unit. In addition, the die used according to the present invention is adapted to facilitate co-extrusion of at least two different polymers.

Moreover, the movement of the robotic handling unit may be aligned with the off-setting of the inner or outer die member in order to obtain extrudates having constant wall thicknesses on the inside and on the outside of the bends.

The combination of the robotic extrusion and the moving die technique leads to the following advantages:

(i) Steric interactions of the extruder/extrusion die with the extrudate can be avoided by the respective movement of the handling unit. In order to prevent the extrudate from coming in contact with the extruder, the extrusion die or the handling unit, the outlet orifice of the die that is arranged at the handling unit is oriented into a direction away from the extruder/handling unit.

(ii) Different wall thicknesses of the extrudate caused by the shaping via the robotic handling unit may be compensated by the combined moving die technique. For instance, the excessive movement of the robotic handling unit would generally result in a bend that is stretched on the outside (wide radius) and compressed on the inside (narrow radius). Consequently, the wall thickness of the wall inside the bend would be thicker compared to the thinner wall outside the bend. Off-setting of the inner or outer part of the die counteracts the formation of different wall thicknesses if the annular die passage is narrow on the inside and wide on the outside of the bend.

In a further embodiment of the invention the obtained article can be subjected to a subsequent blowing step. Thus, the article could be extruded directly into a mold in which it is subsequently blown to its final shape and dimension.

Generally, in conjunction with the present invention, any polymer or polymer blend that may be extruded through a die by applying heat and pressure such as thermoplastics, thermoplastic elastomers (TPE) or vulcanizable rubbers can be used.

The selection of the polymers to be used for the inner layer (A) and the outer layer (B) mainly depends on the intended use of the tubular article to be obtained.

In case that the tubular article is used as a fuel-line it is necessary to choose a fuel-resistant polymer for the inner layer. Such fuel-resistant polymers are, for instance, represented by thermoplastic polyamides that generally suffer from an insufficient green strength. Therefore, the inner polyamide layer has to be supported by an outer layer of a polymer having adequate green strength in order to maintain the shape of the extrudate immediately after extrusion but prior to cooling in the air or under water. Preferably, such supporting polymers are selected from thermoplastic polymers and elastomeric polymers such as thermoplastic elastomers (TPE) or vulcanizable rubbers.

In case that the outer layer is mainly intended for decorative purposes, for instance, if the inner layer contains reinforcing fibers which lead to a poor appearance of the hose, the outer layer is made from a polymer that exhibits a better surface appearance, for instance, a non-fiber-reinforced TPV or a polyolefin.

Thermoplastic polymers (thermoplastics) are particularly suitable for the purpose of the present invention. Examples are polyvinyl chloride, polyvinylidene fluoride (PVDF) polyethylene, polypropylene, polyvinyl acetate, polyester polymers, such as poly(ethylene terephthalate), ABS copolymers, and polyamides, for example, Nylon® 6, 4.6, 6.6, 11 or Nylon® 12.

In general, the polymers are each selected in a manner that the combination of both polymers leads to a co-extruded article having adequate green-strength, i.e., which can be free-shaped without loosing structural integrity or suffering from shape distortion.

A preferred class of extrudable polymers is represented by elastomeric polymers. In conjunction with the present invention the terms "vulcanizable elastomer" and "vulcanizable rubber" can be used interchangeably.

Vulcanizable elastomers/rubbers comprise one class of extrudable elastomeric polymers, especially vulcanizable diene-containing elastomers. Either natural or synthetic rubbers or mixtures thereof are satisfactory. However, non-diene rubbers, such as silicone rubbers or fluorinated rubbers are also satisfactory. Illustrative examples of suitable synthetic rubbers include polymers of cis-4-polybutadiene, butyl rubber, neoprene, ethylene propylene terpolymers such as ethylene/propylene/non-conjugated diene (EPDM) copolymers, polymers of 1,3-butadiene, polymers of isoprene, ethylene/vinyl-acetate copolymers and copolymers of 1,3-butadiene with others monomers, for example, styrene, acrylonitrile, isobutylene and methyl(meth)acrylate. Shaped articles obtained from vulcanizable rubbers have to be vulcanized after co-extrusion. Vulcanization of such rubbers is generally accomplished by heat-treating the shaped article in presence of a vulcanizing agent. Those of ordinary skill in the art will appreciate the appropriate quantities, types of cure systems and vulcanization conditions required to carry out partial or full vulcanization of the rubber.

In a preferred embodiment of the invention at least one layer of the extrudate, preferably the supporting layer, is made from thermoplastic elastomer (TPE) which does not require vulcanization and is shaped above their softening temperature and develop elastomeric properties upon cooling.

Suitable TPEs are selected from polyurethane-polyester elastomers (commercially available under the Trademark Texin®), segmented polyethers and polyesters (commercially available under the Trademark Hytrel®), nylon block polymers such as polyamide thermoplastic elastomers based on aromatic, semi aromatic or aliphatic amides for the hard segment and aliphatic polyesters, polyethers or polycarbonates, styrenic block thermoplastic elastomers, saturated styrenic thermoplastic elastomers (SEBS) and dynamically cured blends of polyolefin resin and mono-olefinic rubber. U.S. Pat. Nos. 3,806,558, 3,023,192, 3,651,014, 3,763,109, 3,775,373, 3,784,520 and 3,533,172, the disclosures of which are fully incorporated herein by reference, illustrate suitable thermoplastic elastomers.

The thermoplastic elastomer of the present invention has a combination of both thermoplastic and elastomeric properties. It is characterized by the simultaneous presence of regions that tend to form amorphous domains and regions that tend to form more crystalline domains or, in other terms, domains having a glass transition temperature (Tg) of 70° C. or higher in the polymer bulk. The amorphous domains provide the polymer with elastomeric (rubbery) properties while the more crystalline domains provide the polymer with thermoplastic properties.

The simultaneous presence of amorphous domains and domains having a high Tg can be accomplished by block-copolymerizing two or more different monomers, at least one of which would tend to form an amorphous, rubbery polymer, if homo-polymerized. This can be exemplified on styrene-butadiene-styrene block copolymer. Styrene tends to form domains having a Tg of 70° C. or more, i.e., thermoplastic blocks, while butadiene tends to form amorphous rubbery blocks. A further typical example is styrene-ethylene-butene-styrene block copolymer (SEBS).

Another type of thermoplastic elastomers is represented by thermoplastic vulcanizates (TPV), although the terms 'thermoplastic elastomers' and 'thermoplastic vulcanizates' are often used interchangeably in the art.

The term 'thermoplastic vulcanizate' as used herein means a mixture comprising small particles of cross-linked rubber well dispersed in a polyolefinic thermoplastic, such as a polypropylene homo- and/or copolymer or random or block-copolymer with the comonomer being ethylene or a polyethylene homo—and/or copolymer with the comonomer being selected from $C_3$ to $C_{18}$ mono-olefins, preferably $C_3$ to $C_8$ mono-olefins. Thermoplastic vulcanizates are usually obtained by dynamic vulcanization. The term 'thermoplastic vulcanizate' indicates that the rubber phase is at least partially vulcanized (cross-linked).

The terms 'cross-linked' and 'vulcanized', 'cross-linking' and 'vulcanization' and 'vulcanize' and 'cross-link' are used interchangeably in conjunction with this invention.

Likewise, the term 'thermoplastic vulcanizate composition' is used interchangeably with the term 'thermoplastic vulcanizate'.

The terms 'rubber' and 'elastomer' are used interchangeably in terms of this application and refer to polymers having elastomeric properties and being curable.

The term 'blend' refers to a mixture of the polypropylene homo- and/or copolymer or the polyethylene homo and/or copolymer and the non-vulcanized rubber.

In context with the dynamically vulcanized rubber component of the thermoplastic vulcanizates used in this invention the term 'fully vulcanized' denotes that the rubber component has been cured to a state in which the physical properties of the rubber are developed to impart elastomeric properties to the rubber generally associated with the rubber in its conventional vulcanized state. The degree of cure of the vulcanized rubber can be described in terms of gel content or, conversely, extractable components. Alternatively, the degree of cure can be expressed in terms of cross-link density.

In general, the less extractables the cured rubber component contains, the better the properties are. Therefore, it is preferable that the compositions comprise a cured rubber phase from which essentially no rubber can be extracted. The term 'essentially no extractable rubber' means that about 5 wt %, preferably 3 wt.-%, more preferably 1 wt.-% or less of the rubber that is capable of being cured can be extracted.

The percent of soluble rubber in the cured composition is determined by refluxing a thin film specimen in boiling xylene for 2 hours, weighing the dried residue and making suitable corrections for soluble and insoluble components based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the thermoplastic elastomer which it is not intended to cure. Any insoluble pigments, fillers, etc., are subtracted from both the initial and final weights.

To employ cross-link density as the measure of the state of cure which characterizes the thermoplastic vulcanizate compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \cdot 10^{-5}$ moles per milliliter of rubber and preferably greater than about $5 \cdot 10^{-5}$ or even more preferably about $1 \cdot 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics.

The cross-link density of the rubber is determined by equilibrium solvent swelling using the Flory-Rehner equation as disclosed in J. Rubber Chem. and Tech. 30, page 929, the disclosure of which is fully incorporated herein. The appropriate Huggins solubility parameters for rubber-solvent pairs used in the calculation were obtained from the review article by Sheehan and Bisio, J. Rubber Chem. & Tech., 39, 149, the disclosure of which is fully incorporated herein. If the extracted gel content of the vulcanized rubber is low, it is necessary to use the correction of Bueche wherein the term 'v' is multiplied by the gel fraction (% gel/100). The cross-link density is half the effective network chain density 'v' determined in the absence of resin. The cross-link density of the vulcanized blends should therefore be understood to refer to the value determined on the same rubber as in the blend in the manner described. Still more preferred compositions meet both of the afore-described measures of state of cure, namely, by estimation of cross-link density and percent of rubber extractable.

The terms 'fully vulcanized', 'fully cured' or 'fully cross-linked' as used in the description and claims mean that the rubber component to be vulcanized has been cured or cross-linked to a state in which the elastomeric properties of the cross-linked rubber are similar to those of the rubber in its conventional vulcanized state, apart from the thermoplastic elastomer composition. The rubber component can be described as fully cured when about 5% or less, preferably about 4% or less, more preferably about 3% or less, and most preferably about 2% or less, of the rubber which is capable of being cured is extractable from the thermoplastic elastomer product by refluxing xylene.

The terms 'partially vulcanized', 'partially cured' or 'partially cross-linked' as used in the description and the claims mean that the rubber component to be vulcanized has been cured or cross-linked to a state so that more than 5% by weight of the rubber which is capable of being cured is extractable from the thermoplastic elastomer product in boiling xylene, e.g. more than 5% by weight and up to 50% by weight, preferably more than 5% by weight and up to 30% by weight, most preferably more than 5% by weight and up to 15% by weight.

The rubber may be a polyolefin rubber which, because of the random nature of its repeat structure or side groups, does not tend to crystallize. However, it is prerequisite that the rubber can be vulcanized by cure systems known in the art. Examples of other rubbers useful in conjunction wit this invention include butyl rubber, halobutyl rubber, halogenated (e.g. brominated) copolymers of p-alkylstyrene and an isoolefin of from 4 to 7 carbon atoms (e.g., isobutylene), natural rubber, homo- and copolymers of at least one conjugated diene monomer like isoprene, butadiene, or combinations thereof. Another class of rubbers is selected from styrene-conjugated diene copolymers such as styrene-butadiene-styrene copolymers, styrene-isoprene-styrene copolymers and their hydrogenated forms such as SEBS, SEPS. Another family of rubbers is represented by styrene-butadiene copolymers commonly called SBR.

Another family of rubbers is represented by ethylene-alpha olefins containing from 4 to 10 carbon atoms that are manufactured using single-site or metallocene catalyst systems with or without long chain branching and which have a density of 0.900 gram/cm$^3$ or below.

Desirably, the rubber is an olefin rubber such as EPDM-type rubber. EPDM-type rubbers are generally terpolymers derived from the polymerization of at least two different mono-olefin monomers containing from about 2 to about 10 carbon atoms, preferably from about 2 to about 4 carbon atoms, and at least one poly-unsaturated olefin containing from about 5 to about 20 carbon atoms. Desirably, said mono-olefins desirably have the formula $CH_2=CH-R$ in which R represents H or an alkyl group containing from about 1 to about 12 carbon atoms. Ethylene and propylene are preferred. Desirably, the repeat units from at least two mono-olefins (and preferably from ethylene and propylene) are present in the polymer in weight ratios of about 25 to 75 to about 75 to 25 (ethylene: propylene) and constitute from about 90 to about 99.6 weight percent of the polymer. The polyunsaturated olefin can be selected from straight-chain, branched, cyclic, bridged ring bicyclic compounds, fused-ring bicyclic compounds, and the like and preferably is represented by a non-conjugated diene. Typical examples of non-conjugated dienes are 5-ethylidene-2-norbornene (ENB), 5-vinyl-2-norbornene (VNB), 5-methylidene-2-norbornene (MNB), 1,4-hexadiene (HD), dicyclopentadiene (DCPD), 1,6-octadiene, 5-methyl-1,4-hexadiene, 3,7-dimethyl-1,6-octadiene, and the like. Desirably the amount of repeat units from the non-conjugated polyunsaturated olefin is from about 0.4 to about 10 weight percent of the rubber, based on the amount of the rubber.

Further suitable rubbers may be selected from the group consisting of acrylic rubbers, alkyl acrylate rubbers such as ethyl acrylate rubbers, and hydrogenated nitrile rubbers and rubbers selected from those disclosed in U.S. Pat. Nos. 4,654,402; 5,397,839; 5,300,573; 5,591,798; 5,523,350; 5,783,631; 5,777,033; 5,777,029; 5,942,577; 5,656,693; 5,589,544; 5,910,543; 6,140,424; 6,069,202; 6,084,031; 6,329,463; 6,020,427; 6,020,431, the disclosure of each of which is fully incorporated herein by reference.

The thermoplastic vulcanizates used for this invention are prepared by using dynamic vulcanization techniques. Dynamic vulcanization is a process in which at least one rubber is cross-linked within a blend that includes the rubber and at least one non-vulcanizing polymer, i.e., thermoplastic polymer, while both polymers are undergoing mixing or masticating at some elevated temperature; the mixing or masticating continues until a desired vulcanization is achieved. Thermoplastic vulcanizates and processes for preparing them are well known in the art, see for instance, U.S. Pat. Nos. 4,130,535, 4,311,628, 4,594,390, and 5,672,660, and "Dynamically Vulcanized Thermoplastic Elastomers", S. Abdou-Sabet al., Rubber Chemistry and Technology, Vol. 69, No. 3, Jul.-Aug. 1996, and references cited therein.

More specifically, the thermoplastic polyolefin as defined above, the uncured rubber, and, the optional, additives are melt-mixed in a mixer heated to above the melting temperature of the thermoplastic polyolefin. The optional additives as well as part of the thermoplastic component can be added at this stage or later (e.g. by means of a side feeder if an extruder is used). After sufficient molten-state mixing to form a well mixed blend, an efficient amount of a vulcanizing system is generally added. In some embodiments it is preferred to add the vulcanizing system in solution with a liquid, for example, rubber processing oil, or in a solid master-batch which is compatible with the other components, for instance, polypropylene master-batch pellets previously compounded with the vulcanizing system.

The rubber processing oil can be split and can be added at various stages of processing, including after the curing of the rubber phase.

It is convenient to follow the progress of vulcanization by monitoring mixing torque or mixing energy requirements during mixing. The mixing torque or mixing energy curve generally goes through a maximum after which mixing can be continued somewhat longer in order to improve the production of the blend. If desired, one can add some of the ingredients after the dynamic vulcanization is complete.

If fillers are added, it is usually desirable to allow the fillers and a portion of any plasticizer to distribute within the rubber or in the thermoplastic phase before the rubber phase is vulcanized. Vulcanization of the rubber can occur in a few minutes or less depending on the mix temperature, shear rate, and activators present for the curative. Suitable curing temperatures include from about 140° C. or from about 150° C. to about 260° C., more preferred temperatures are from about 150° C. or from about 170° C. to about 225° C. or to about 240° C. The mixing equipment can include Banbury™ mixers, Brabender™ mixers, and certain mixing extruders such as co-rotating, counter-rotating, and twin-screw extruders, as well as co-kneaders, such as Buss® kneaders.

After discharging from the mixer the blend containing the vulcanized rubber and the thermoplastic can be milled, chopped, extruded, pelletized, injection-molded, or processed by any other desirable technique.

An additional TPV composition of interest comprises from 15 to 60 weight percent of a polyalkylene phthalate polyester polymer or copolymer and from 40 to 85 weight percent of a polyacrylate or polyethylene/acrylate rubber in combination with an effective amount of peroxide free-radical initiator and an organic diene co-agent such as those disclosed in U.S. published patent application 20040115450, the disclosure of which is fully incorporated herein by reference.

The thermoplastic vulcanizates which may be used in conjunction with the present invention may further comprise thermoplastic engineering resins, such as polyamides, polyesters, polycarbonates. Those thermoplastic engineering resins may be used as an additive to the thermoplastic vulcanizates or as the sole thermoplastic phase.

In a preferred embodiment of the present invention the outer layer (B) is formed from the thermoplastic elastomer as described above and the inner layer (A) is formed from a thermoplastic such as polyamide or PVDF. In this case the outer layer (B) supports the inner layer (A) suffering from insufficient green strength.

In a further preferred embodiment of the present invention the outer layer (B) is formed from the thermoplastic to be supported while the inner layer (A) is the supporting thermoplastic elastomer layer.

In a further embodiment the supporting layer is made of a vulcanizable rubber while the supported layer is made of a polyamide.

In a still further embodiment the supporting layer is made of a thermoplastic elastomer while the supported layer is made of a vulcanizable rubber.

In accordance with the present invention at least one of the polymer layers may be fiber-reinforced. Such fiber-reinforcement, if the fibers are properly oriented, leads to polymers having increased green strength and improved mechanical properties such as higher burst strength, etc.

The present invention is not limited to any special kind of reinforcing fibers. Accordingly, any kind of organic, inorganic, synthetic or non-synthetic fibers can be used as the reinforcing fiber, for instance, fibers selected from the group consisting of polyesters, polyaramids, polyethylene naphthalate (PEN), polyester-polyacrylates, polyvinylchloride, polypropylene, polyphenylene sulfide, polyetherimide, polyamides, polyimides or cellulose fibers are used. As an alternative, inorganic fibers such as glass, steel, boron, carbon or wollastonite fibers, clay, nano-clays, talcum or fibrous hydrated magnesium silicate of the formula $Mg_4Si_6O_{15}(OH)_2 \cdot 6H_2O$ can be used.

In a preferred embodiment polyaramid fibers or polyester-polyarylate fibers are used. Both kinds of fibers are characterized by high mechanical stability which facilitates the recycling of the reinforced thermoplastic elastomer compositions without decreasing their fiber-length. Suitable polyaramid fibers are commercially available from Teijin Twaron B.V. under the trade designation Twaron® polyester-polyarylate fibers are available under the trade designation Vectran® from Celanese. According to the present invention the reinforcing fibers preferably have a fiber length of from about 0.3 mm to 20 mm, preferably from about 1 mm to 15 mm or 6 mm, most preferably from about 2 mm to 4 mm.

In a preferred embodiment the diameter of said fibers ranges from about 1 to about 100 µm, preferably from about 5 to about 75 µm, most preferably from about 10 to about 30 µm.

In the fiber reinforced polymers used in accordance with the present invention the amount of reinforcing fibers is from about 1 to about 60; wt.-%, preferably from about 2 to about 30 wt.-%, most preferably from about 2.5 to 20 wt.-%, based upon the total of the polymer (rubbers, thermoplastics or thermoplastic elastomers) and the reinforcing fibers.

Typically, most of the reinforcing fibers mentioned above require a surface treatment in order to achieve good adhesion to the surrounding elastomeric matrix.

For instance, Twaron® fibers which, inter alia, may be used in the present invention comprise a cured epoxy-containing finish as disclosed in EP 0 107 887 B1, the disclosure of which is fully incorporated herein by reference.

In a preferred embodiment of the present invention the reinforcing fibers are adhesion activated in order to improve the adhesion between the fiber surface and the embedding thermoplastic elastomer composition matrix. Therefore, the fibers are surface treated prior to embedding them into the elastomer composition matrix. The surface treatment promotes adhesion by the formation of a thin layer of the adhesion activating agent (adhesion promoter) on the fiber surface.

In a preferred embodiment of the present invention polyester, polyester-polyarylate- or polyaramid fibers have been treated by the method as described in U.S. Pat. No. 5,609,962 in col. 2, line 10 to col. 8 line 47, the disclosure of which is fully incorporated herein by reference. According to said method the fibers may optionally be epoxy-activated which means that the polyester is treated with an epoxy derivative such as 1-chloro-2,3-epoxypropane (epichlorohydrine).

In a first step the fibers can be treated with a water-dispersible, blocked di-isocyanate in aqueous dispersion. The blocked di-isocyanates are selected from caprolactam blocked methylene-bis-(4-phenylisocyanate) or 4,4'-methylene-bis-(phenylcarbanilate).

The treatment may be carried out by dipping the fibers into the dispersion containing the blocked diisocyanate. The dipping time commonly depends on the nature fibers and can vary from 1 second to 1 hour. After dipping the fibers are dried at a suitable temperature to effect the evaporation of water. Drying can be accomplished by exposing the fibers to a temperature of from 100° C. to 240° C. for 1 to 60 minutes, depending on the nature of the fibers.

In a second step the treated and dried fibers are then treated with a water-based epoxy resin emulsion in an aqueous emulsion. The epoxy resins are selected from glycerol-poly-glycidylether (e.g. Glycidether 100, supplied by Raschig, Germany), epoxy resin resulting from the reaction between bisphenol A and epichlorohydrin and modified in order to make it water emulsifiable, such as Epikote® DX 258, a product of Shell Chemical or Eurepox® 756/67W supplied by Witco. As to the treatment, to the conditions of the treatment and the subsequent drying step it is referred to what has been set out above with respect to the treatment of the fibers with the dispersion of the blocked diisocyanate. Instead of dipping the fibers into the emulsions/dispersions the emulsions/dispersions can also be sprayed onto the surface of the fibers and subsequently dried.

It should be noted that the first and the second step for the treatment of the fibers can be reversed, i.e. the treatment of the fibers with the epoxy resin can be carried out prior to the treatment of the fibers with the blocked di-isocyanate. The treatment of the fibers with the blocked diisocyanate and the epoxy resin can also be carried out in one step, i.e. simultaneously. In this instance only one drying step is required.

The treatment of the fibers can also be carried out using the dispersion of the blocked di-isocyanate alone and applying it as described above. The final amount of the treatment agent (blocked di-isocyanate and epoxy-resin or blocked di-isocyanate alone) on the treated fibers is about 5 to about 500 grams per one m² of fiber surface, preferably about 20 to about 100 g/m².

The dried fibers are then further processed by bonding thereon the modified thermoplastic elastomer under the influence of heat and pressure as described herein below.

In conjunction with the present invention a caprolactam-blocked diisocyanate supplied by EMS-Chemie, Switzerland, under the trade designation Grillbond® is preferably used.

Generally, any adhesion activation system known in the art for improving and/or imparting adhesion of filaments, such as polyester, polyaramid and polyamide fibers/filaments to rubbers when forming fiber-reinforced rubber composites can be utilized such as those disclosed in U.S. Pat. Nos. 9,956,566; 3,964,950; 3,968,304; 3,991,027; 4,009,134; 4,026,744; 4,134,869; 4,251,409 and 4,409,055, the entire disclosures of which are incorporated herein by reference.

In general, the polymer is applied to the fibers under exposure to heat and pressure, for instance, by use of conventional mixing equipment such as roll mills, Banbury mixers, Brabender mixers, continuous mixers, mixing extruders, and the like.

In addition or as an alternative to the fiber reinforced layer the extruded tubular article according to the present invention may comprise a foam layer. Such foam layers may be achieved by chemical or mechanical foaming. Chemical foaming occurs by addition of foaming agents to the polymers during extrusion. Suitable foaming compositions and foaming agents are known from the prior art, for instance, from U.S. Pat. Nos. 5,009,809; 5,045,570; 5,728,744; 5,611,962 and EP-A-02731418 the disclosures of each which are fully incorporated herein by reference.

The ratio of the inner layer to the outer layer mainly depends on the nature of the polymers forming these layers and its physical properties, in particular, on its respective green strength.

In one embodiment of the invention the inner (A) or outer layer (B) forms a thin coating on the inner layer (B) which constitutes a protection layer for the inner layer (A). In another embodiment the inner (A) or outer layer (B) constitutes a support layer for the other layer. Consequently, the ratio of the thickness of the inner layer (A) to the outer layer (B) may vary over a broad range. Generally the ratio of the thickness of the inner layer (A) to the outer layer (B) ranges from about 1:100 to about 100:1, preferably from about 1:10 to about 10:1, most preferably from about 1:5 to about 5:1.

In a further embodiment of the invention at least one intermediate layer (I) can be applied between the inner layer (A) and the outer layer (B). This intermediate tie layer (1) may, for instance, be represented by an adhesive that bonds both layers to each other. The intermediate tie layer may also be represented by a compatibilizer layer, which facilitates the co-extrusion of two polymers that have different properties, such as polarities.

In case that the intermediate layer (I) is thin in comparison to the inner layer A) and the outer layer (B) a small co-extruder or melt-dispensing unit for the intermediate layer polymer (I) may be attached straight to the extrusion die. The extruder for the intermediate tie layer polymer is then moved with the robotic handling unit.

While in accordance with the Patent Statutes, the best mode and preferred embodiment have been set forth, the scope of the invention is not limited thereto, but rather by the scope of the attached claims.

The invention claimed is:

1. A process for manufacturing a tubular shaped co-extruded article comprising:
processing first and second polymers in an extruder apparatus to form a tubular-shaped extrudate having at least one bend, the extruder apparatus comprising:
(1) an extrusion die adapted to form a tubular extrudate; and
(2) at least two extruder barrels/heads adapted to extrude said polymers through said extrusion die in order to form a tubular polymeric extrudate having an inner polymer layer (A) and an outer polymer layer (B);
wherein said extruder barrels discharge through said extrusion die which is controllably connected to a robotic handling unit wherein said extrusion die is a moving mandrel expanding die including an inner die member and an outer die member, where the process includes off-setting the inner die member and the outer die member relative to movement of the robotic handling unit to thereby obtain tubular-shaped extrudates having constant wall thickness on the inside and on the outside of the extrudate; and
solidifying the extrudate,
wherein the first polymer is a thermoplastic vulcanizate comprising:
a fully cured EPDM-type rubber and a polypropylene thermoplastic polyolefin, where the EPDM-type rubber is cured to an extent where less than 5 wt. % of the rubber can be extracted; and
wherein the second polymer is a polyamide, and
wherein the thermoplastic vulcanizate forms the outer layer (B) and the polyamide forms the inner layer (A).

2. A process for manufacturing a tubular article comprising the steps of:
   (i) coextruding a first polymer and a second polymer through an extrusion die having an inner die member and an outer die member;
   (ii) moving the extrusion die while simultaneously shaping the first polymer and the second polymer into a free-form tubular extrudate having at least one bend, wherein the tubular extrudate (a) has an inner layer comprising the first- polymer and an outer layer comprising the second polymer or (b) a tubular extrudate has an inner layer comprising the second polymer and an outer layer comprising the first polymer, wherein the inner die member and outer die member are off-set relative to the movement of the die such that the inner layer and outer layer of the tubular extrudate have a constant wall thickness; and
   (iii) solidifying the tubular extrudate, where said first polymer is a thermoplastic elastomer or a vulcanizable rubber, and where said second polymer is a polyamide or PVDF, where the thermoplastic elastomer is selected from the group consisting of polyurethane-polyester elastomers, segmented polyethers and polyesters, nylon block polymers, styrenic block thermoplastic elastomers, saturated styrenic thermoplastic elastomers (SEBS) and dynamically cured blends of polyolefin resin and mono-olefinic rubber (TPV), and where the vulcanizable rubber is selected from the group consisting of vulcanizable diene-containing elastomers, natural or synthetic rubbers or mixtures thereof, non-diene rubbers, cis-4-polybutadiene, butyl rubber, neoprene, ethylene/propylene/non-conjugated diene terpolymers, polymers of 1,3-butadiene, polymers of isoprene, ethylene/vinyl-acetate copolymers and copolymers of 1,3-butadiene with other monomers.

3. The process of claim 1, wherein at least one layer is formed from a fiber reinforced polymer.

4. The process of claim 1, wherein the ratio of thickness of the inner layer (A) to the outer layer (B) ranges from 1:100 to 100:1.

5. The process of claim 1, wherein at least one intermediate layer (I) is applied between the inner layer (A) and the outer layer (B).

6. The process of claim 5, wherein the intermediate layer (I) is represented by an adhesive.

7. The process of claim 1, wherein at least one layer is foamed.

8. The process of claim 2, wherein the first polymer is a thermoplastic vulcanizate comprising
   (i) a fully cured rubber; and
   (ii) a thermoplastic polyolefin homopolymer or copolymer.

9. The process of claim 1, where the inner layer (A) consists essentially of polyamide.

10. The process of claim 1, where the polymer content of the inner layer consists of a polyamide.

11. The process of claim 2, where the inner layer consists essentially of a polyamide.

12. The process of claim 2, where the outer layer consists essentially of a polyamide.

13. The process of claim 1, further comprising processing, with the first and second polymers, a third polymer to thereby form an intermediate layer (I) between outer layer (B) and inner layer (A), where the third polymer is a compatibalizer that facilitates the co-extrusion of the first and second polymers.

14. The process of claim 2, further comprising the step of simultaneously shaping a third polymer, with said first and second polymers, to thereby position the third polymer between the first and second polymers and thereby form an intermediate layer, where the third polymer is a compatiblizer that facilitates the co-extrusion of the first and second polymers.

15. The process of claim 1, where the polyamide has insufficient green strength such that a tubular extrudate prepared from the polyamide would collapse upon leaving an extrusion die adapted to form a tubular extrudate.

16. The process of claim 2, wherein the second polymer has insufficient green strength to maintain a tubular shape after said step of shaping the tubular extrudate.

17. The process of claim 16, wherein the first polymer has sufficient green strength to maintain a tubular shape after said step of shaping the tubular extrudate.

* * * * *